(12) United States Patent
Wan William Lau et al.

(10) Patent No.: US 8,379,525 B2
(45) Date of Patent: Feb. 19, 2013

(54) TECHNIQUES TO SUPPORT LARGE NUMBERS OF SUBSCRIBERS TO A REAL-TIME EVENT

(75) Inventors: Cheuk Wan William Lau, Bellevue, WA (US); RaviKant Cherukuri, Snoqualmie, WA (US); Stephen Gordon, Woodinville, WA (US); Offir Bakshitz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 12/892,649

(22) Filed: Sep. 28, 2010

(65) Prior Publication Data

US 2012/0075996 A1    Mar. 29, 2012

(51) Int. Cl.
*H04L 12/26* (2006.01)
(52) U.S. Cl. .................................................. 370/235.1
(58) Field of Classification Search .................. 370/229, 370/235, 235.1; 709/204, 205, 206
See application file for complete search history.

(56) References Cited

U.S. PATENT DOCUMENTS

| | | | |
|---|---|---|---|
| 7,653,753 B2 | 1/2010 | Chen et al. | |
| 7,664,816 B2* | 2/2010 | Heron et al. | 709/204 |
| 7,720,910 B2 | 5/2010 | Goodman et al. | |
| 7,844,668 B2* | 11/2010 | Canning et al. | 709/206 |
| 7,904,515 B2* | 3/2011 | Ambati et al. | 709/205 |
| 8,161,110 B2* | 4/2012 | Verhaeghe et al. | 709/205 |
| 2002/0120757 A1* | 8/2002 | Sutherland et al. | 709/229 |
| 2003/0084158 A1 | 5/2003 | Saito et al. | |
| 2003/0115291 A1 | 6/2003 | Kendall et al. | |
| 2003/0135556 A1 | 7/2003 | Holdsworth | |
| 2004/0181588 A1 | 9/2004 | Wang et al. | |
| 2004/0254809 A1* | 12/2004 | Teicher | 705/1 |
| 2006/0067233 A1 | 3/2006 | Fukuda et al. | |
| 2006/0120385 A1* | 6/2006 | Atchison et al. | 370/400 |
| 2006/0146991 A1 | 7/2006 | Thompson et al. | |
| 2006/0242328 A1 | 10/2006 | Guo et al. | |
| 2008/0071901 A1* | 3/2008 | Adelman et al. | 709/223 |
| 2009/0003248 A1* | 1/2009 | Shima et al. | 370/260 |
| 2010/0070607 A1 | 3/2010 | Khan et al. | |
| 2010/0186025 A1 | 7/2010 | Thomas et al. | |
| 2012/0042013 A1* | 2/2012 | Roman et al. | 709/204 |

OTHER PUBLICATIONS

Bittner, Sven et al., "Pruning Subscriptions in Distributed Publish/Subscribe Systems", Proceedings of the 29th Australasian Computer Science Conference, vol. 48, Jan. 16-19, 2006, pp. 10.

Cao, Fengyun et al., "Efficient Event Routing in Content-based Publish-Subscribe Service Networks", in IEEE INFOCOM, 2004, pp. 12.

International Search Report, Mailed Date: May 24, 2012, Application No. PCT/US2011/051145, Filed Date: Sep. 11, 2011, pp. 10, (MS# 330222.02).

* cited by examiner

*Primary Examiner* — Chi Pham
*Assistant Examiner* — Robert Lopata (57) ABSTRACT

Techniques to manage large numbers of subscribers to real-time events are described. Embodiments may filter subscribers dynamically into buckets where publications are distributed only to subscribers in the same bucket as the publisher. Buckets may be dynamically created and removed to lower or raise the publication rate for subscribers to an acceptable level. Embodiments may use a two-level bucketing algorithm for filtering that is memory and CPU efficient, and scales with large numbers of subscriptions. The techniques may also reduce the context loss for a subscriber when a new bucket has to be created and subscribers distributed between buckets. Embodiments may be scaled out to multiple servers, to accommodate very large numbers of subscribers and publications. Other embodiments are described and claimed.

20 Claims, 8 Drawing Sheets

TECHNIQUES TO SUPPORT LARGE NUMBERS OF SUBSCRIBERS TO A REAL-TIME EVENT

BACKGROUND

In a real-time event, such as a live chat, having a large number of subscribers and publishers, the amount of real-time data flowing through the event can be overwhelming to the human user, the subscribing device, and the distribution server. For a large number of subscribers, e.g. thousands or more, even a small number of publications per second can quickly consume large amounts of bandwidth and processing power as each publication is distributed to each subscriber. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter. Various embodiments are generally directed to techniques to support large numbers of subscribers to a real-time event. Some embodiments are particularly directed to techniques to allocate subscribers to a bucket and slot system for managing the large numbers of subscribers and the network traffic they generate. In one embodiment, for example, a technique may include allocating subscribers to a real-time event to a bucket and a slot within the bucket. The technique may further include monitoring a publication rate for the real-time event, and adding or removing a bucket when the publication rate exceeds a first threshold or falls below a second threshold. The technique may further include publishing a first subscriber publication only to other subscribers allocated to the same bucket as the first subscriber. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to techniques and systems to support large numbers of subscribers to a real-time event. Embodiments may filter subscribers dynamically into buckets where publications are distributed only to subscribers in the same bucket as the publisher. Buckets may be dynamically created and removed to lower or raise the publication rate for subscribers to an acceptable level. Embodiments may use a two-level bucketing algorithm for filtering that is memory and CPU efficient, and scales with large numbers of subscriptions. The techniques may also reduce the context loss for a subscriber when a new bucket has to be created and subscribers distributed between buckets. Embodiments may be scaled out to multiple servers, to accommodate very large numbers of subscribers and publications. As a result, the embodiments can improve affordability, scalability, modularity, extendibility, or interoperability for an operator, device or network.

An example of the data flow issues that may be present in a conventional real-time event follows. For a real-time chat event having, for example, one million subscribers, if five percent of the subscribers publish a comment in a given second, the number of comments to distribute per subscriber would be 50,000. If each comment is 200 bytes in size, the bandwidth consumed per subscriber would be 10 MB/s. This is not only inefficient when the data are not fully consumed, but it can saturate the network, and also consume a large amount of processor resources to process. Devices such as smart phones may be overwhelmed. The distribution server will have to distribute 50,000 comments to one million subscribers, which may require high processing cost, and, at 200 bytes per comment, would consume 10 TB/s. Further, the context of published comments may be lost in the sheer volume of publications, making it difficult to follow for any given subscriber. This may overwhelm the subscriber who cannot consume 50,000 comments per second.

Figure 1:
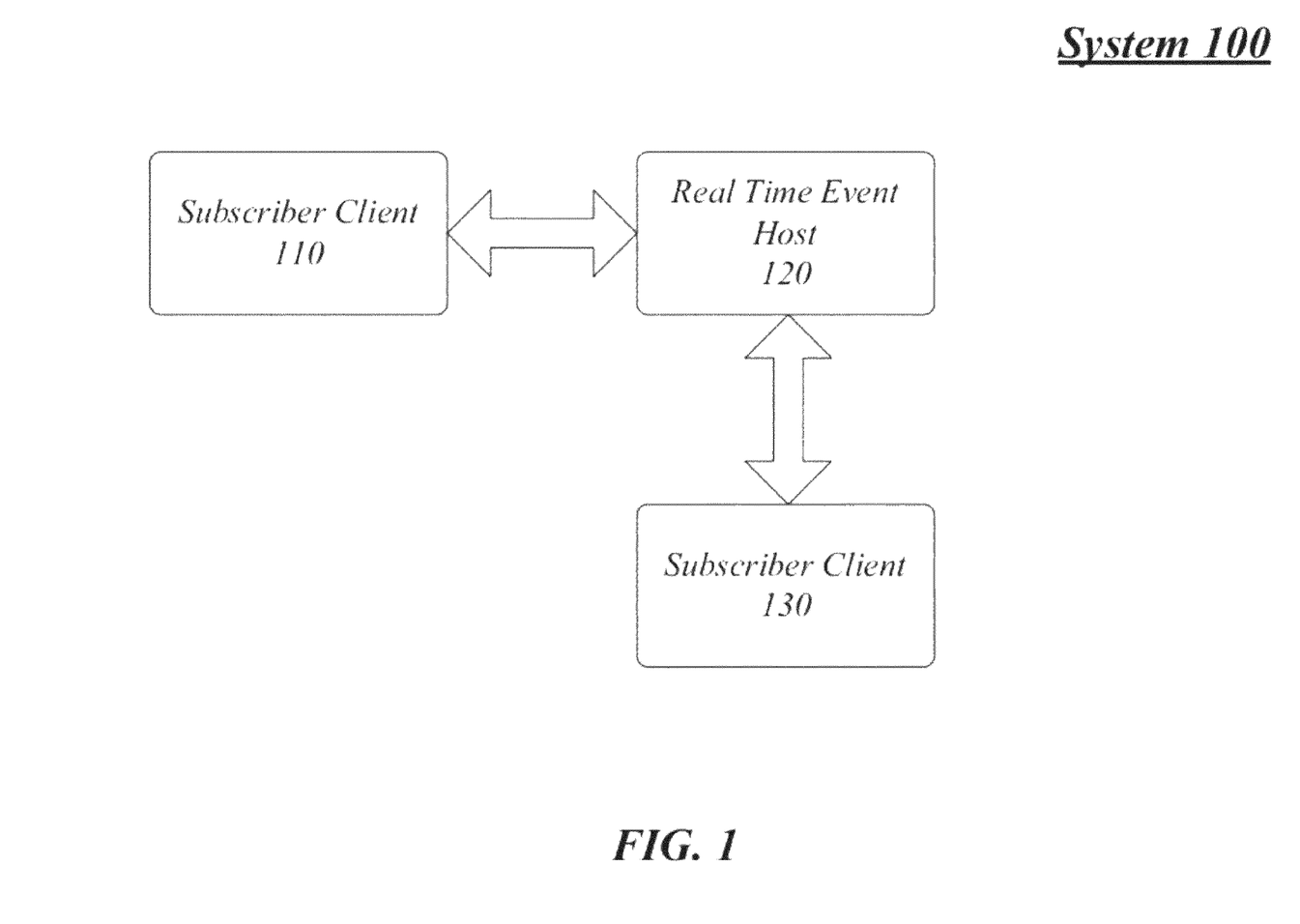
FIG. 1 illustrates an embodiment of a system for managing real-time events.

FIG. 1 illustrates a block diagram for a system 100 to support large numbers of subscribers to a real-time event. In one embodiment, for example, the system 100 may comprise a computer-implemented system 100 having multiple components, such as subscriber 110, real-time event host 120, and subscriber 130. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the components of system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components of system 100 may be communicatively coupled via various types of communications media. The components may coordinate operations between each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the system 100 may comprise subscribers 110, 130. Embodiments are directed generally to large numbers of subscribers, e.g. hundreds, thousands or millions. Two subscribers are shown for simplicity. Subscribers 110, 130 may be electronic devices as described above. For the purposes of discussion, the person or user using subscriber 110 or 130 may also be referred to as a subscriber, and it is to be understood that the person subscribes to and publishes to the real-time event via subscribers 110, 130. Subscribers 110, 130 may receive and display publications, e.g. text, images, video or other content published to the real-time event. Subscribers 110, 130 may allow the user to input a publication, for example by typing on a keyboard, video or photographs from a camera, audio from a microphone, etc. Subscribers 110, 130 may then publish the input publication to the real-time event in the manner described below.

In various embodiments, the system 100 may comprise real-time event host 120. Real-time event host 120 may manage the subscribers and the publication of content to the subscribers. Real-time event host 120 may maintain a two-tiered bucketing system where the first level is made of slots and second level is made of buckets. A slot contains of a set of subscribers, and bucket contains of a set of slots. On joining a real-time event, a subscriber may be placed in a slot according to a decision algorithm. When a subscriber publishes, all the subscribers in the set of slots belonging to the same bucket as the publisher may receive the publication. Subscribers allocated to different buckets may not receive the publication. The number of buckets may be dynamically adjusted depending on criteria, such as the publishing rate per bucket or a number of subscribers. The grouping of slots to buckets may be based on some decision algorithm, e.g. clustering algorithms. Creating a new bucket may reduce the number of slots in a bucket, thereby reducing the number of publications per bucket. Similarly, removing a bucket may allocate more slots in a bucket, thereby increasing the number of publications per bucket. Bucketing in this manner preserves a content context for the set of subscribers allocated to the same bucket.

Real-time event host 120 may load balance subscriptions across a set of servers. A subscriber may be allocated to a given server using some decision algorithm. Each server may maintain the same two-level bucketing system described above. Each publication may be sent to all the servers in the set, and each server may use the two-level bucketing system to publish the publication to the bucket that the publication belongs to. In effect, the set of buckets across the servers that received the publication are under the same logical bucket.

Figure 2:
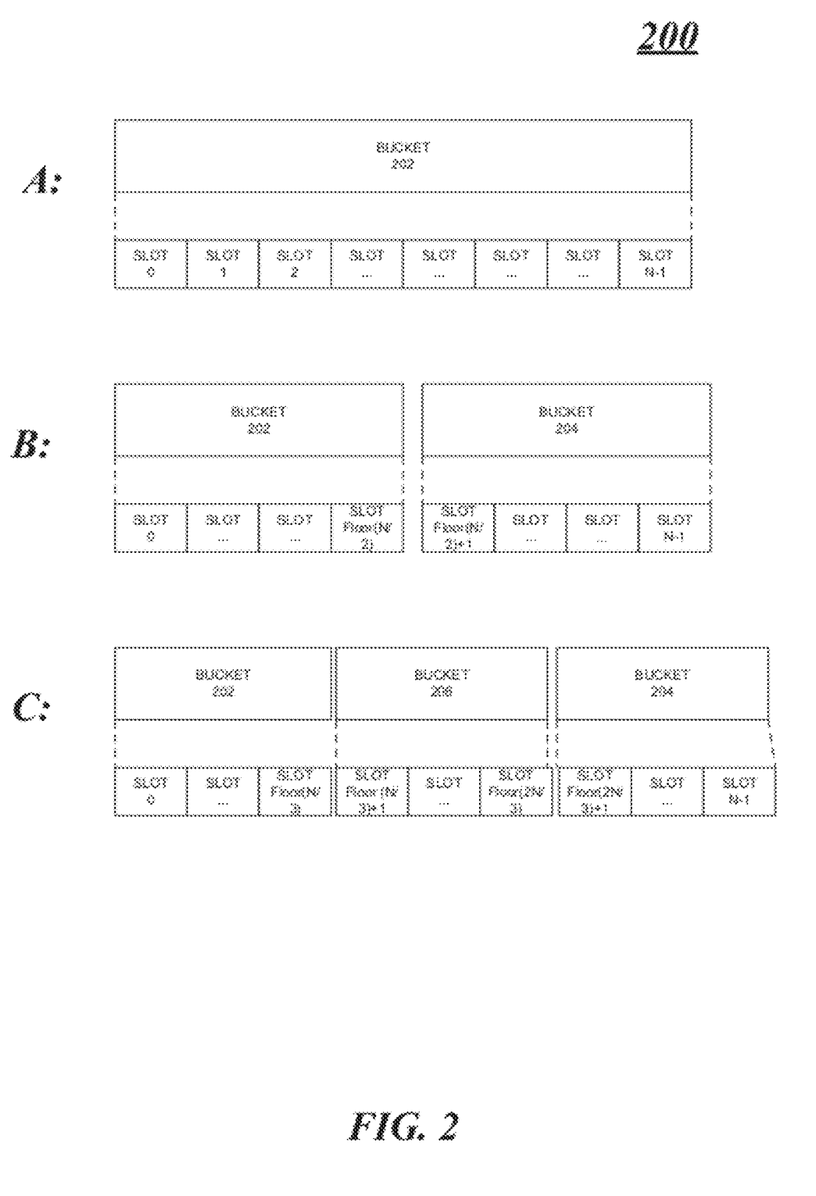
FIG. 2 illustrates an embodiment of a bucketing system.

FIG. 2 illustrates an embodiment of a two-tiered bucketing system 200, in three different stages, as may be implemented by system 100. Bucketing system 200 may have N slots, numbered 0 to N−1. In stage A, all N slots are allocated to one bucket: bucket 202. Subscribers may be allocated to a slot, for example, by hashing the subscriber name, session ID, or other identifier. Other allocation methods may be used to achieve a substantially even distribution. In an embodiment, the slots may be maintained in an ordered manner.

In stage B, a bucket 204 is added to system 200. In an embodiment, slots 0 to N−1 are divided between the two buckets. The numbered order may be maintained such that slots 0 to floor (N/2) remain with bucket 202, while slots numbered floor (N/2)+1 to N−1 are allocated to bucket 204. Using such a continuous segment approach may keep as many adjacent allocations as possible, thereby increasing the chance that subscribers will remain in the same bucket after a bucket increase.

In stage C, a third bucket 206 is added to system 200. Slots 0 to N−1 are again redistributed among the three buckets. Slots 0 to floor (n/3) remain in bucket 202, slots floor (N/3)+1 to floor (2N/3) are allocated to new bucket 206, and slots (2N/3)+1 to N−1 remain in bucket 204.

System 200 may monitor an average publication rate per bucket over time for all of the buckets. If the publication rate goes over a first threshold (upper bound), a bucket may be added, which may reduce the publication rate per bucket. Buckets may be added until the publication rate is reduced below the upper bound threshold or until then number of buckets is the same as number of slots. If the publication rate goes lower than a second threshold (lower bound), a bucket may be removed, which may increase the publication rate per bucket. Buckets may be removed until the publication rate is increased above the lower bound threshold or there is only one bucket left. To avoid oscillation between bucket increase and decrease, the moving average publication rate of a number of periods may be used. That is, the publication rate may be the moving average rate of publications per bucket.

Figure 3:
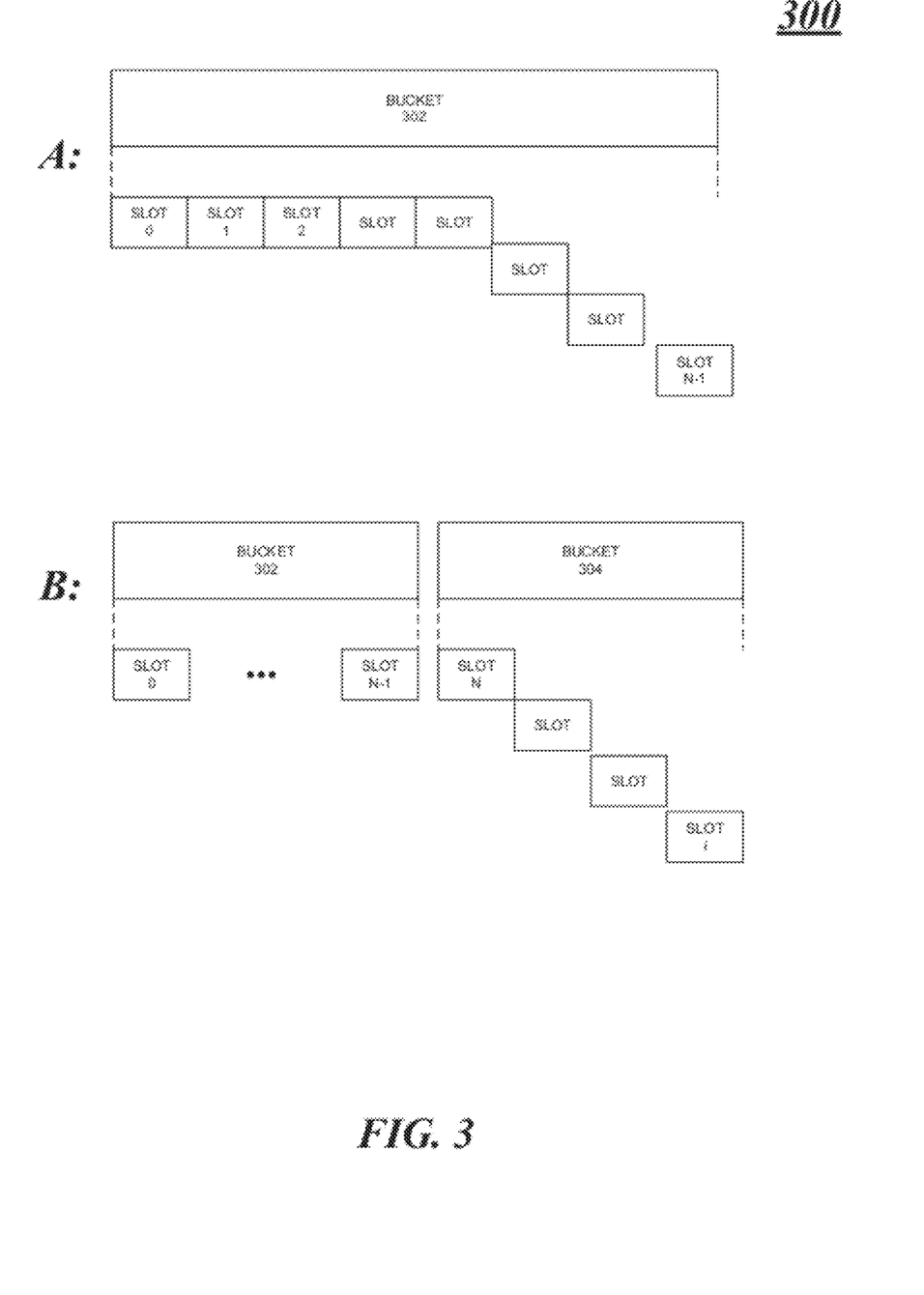
FIG. 3 illustrates an embodiment of a second bucketing system.

FIG. 3 illustrates an embodiment of allocating slots to a bucket, and adding buckets, in a two-tiered bucketing system 300, in two different stages. System 300 may be implemented by system 100. In stage A, bucketing system 300 may begin with some number of ordered slots allocated to one bucket 302. System 100 may monitor a publication rate of bucket 302. While the publication rate is below a first threshold publication rate (upper bound), system 100 may add slots to bucket 302 until the addition of slot N causes the publication rate of bucket 302 to rise above the first threshold publication rate.

In stage B, a second bucket 304 is added. Additional ordered slots, starting with slot N, are then allocated to bucket 304 until the publication rate of bucket 304 exceeds the first threshold publication rate or the maximum number of slots is reached.

In an embodiment, when the publication rate of a bucket in system 300 falls below a second threshold publication rate (lower bound), the last bucket created may be removed and its slots reallocated to the previous bucket.

In an embodiment (not shown), system 100 may monitor the publication rate for each bucket per period of time. Using the same upper bound and lower bound threshold principle as described before, buckets may be split and merged based on the threshold. Starting with one bucket holding all of the slots, as the publication rate exceeds the first threshold, the one bucket may be divided into two buckets, called bucket A and bucket B. When bucket A's publication rate exceeds the first threshold, bucket A may be divided into two buckets, leaving bucket B untouched. The individual buckets may be divided until all buckets are between the first and second thresholds.

In this embodiment, when a bucket's publication rate falls below the lower bound, that bucket may be considered for merging. In an embodiment, the bucket to be merged may be merged into a second bucket such that the combination would not exceed the upper bound.

Figure 4:
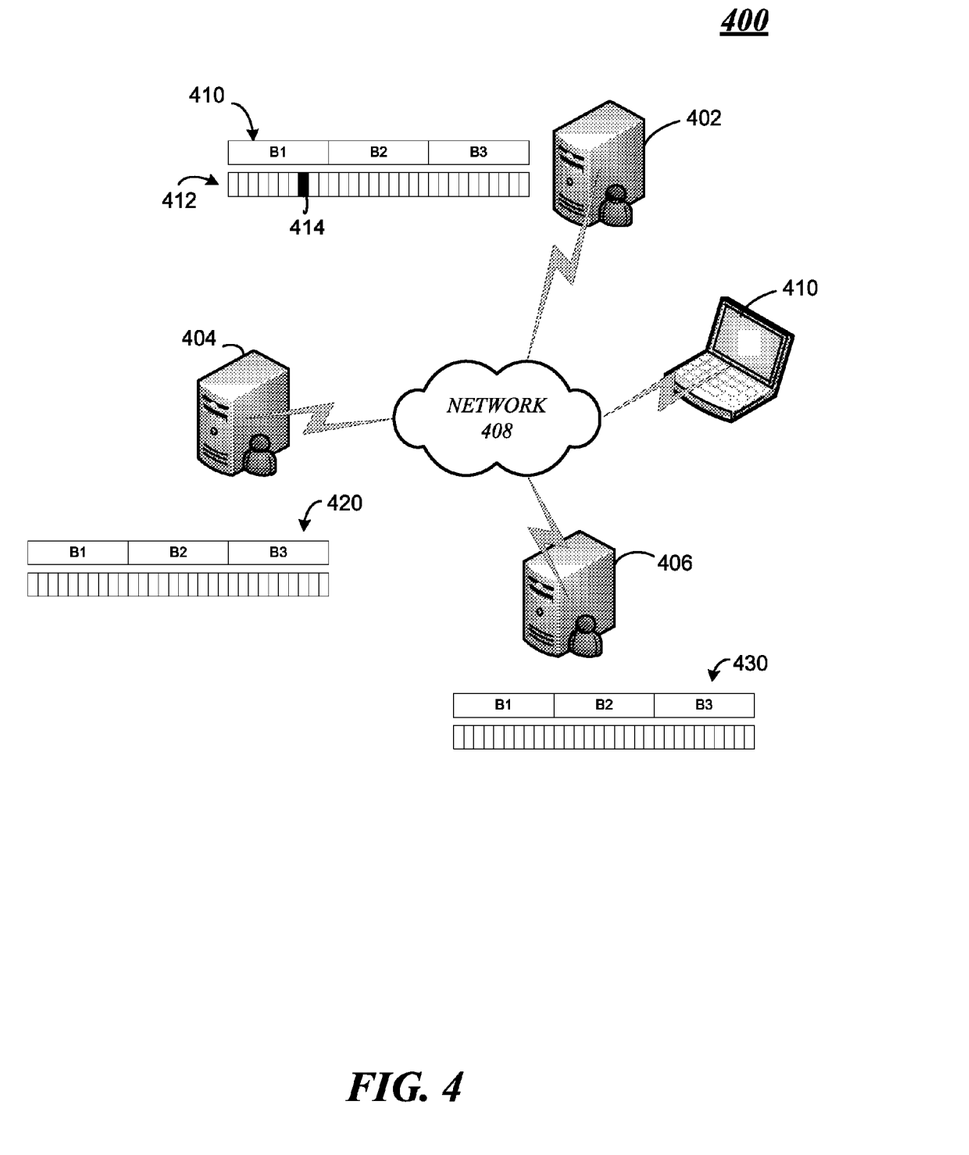
FIG. 4 illustrates an embodiment of a distributed system for managing real-time events.

FIG. 4 illustrates a block diagram of a system 400 that may implement real-time event host 120. System 400 may comprise one or more servers, such as servers 402, 404 and 406. System 400 may further comprise many subscribers, represented by subscriber 410, to a real-time event hosted by the servers 402, 404, 406. Servers 402, 404, 406 may communicate information among each other and with subscriber 410 using a network 408.

Network 408 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators).

Servers 402, 404, 406 and subscriber 410 may include various types of standard communication elements designed to be interoperable with network 408, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication among servers 402, 404, 408 and subscriber 410 can be in the form of a data packet adapted to be transmitted between two or more computer processes. The data packet may include a cookie and/or associated contextual information, for example.

Each server may maintain its own bucketing system. For example, server 402 may have bucketing system 410; server 404 may have bucketing system 420; and server 406 may have bucketing system 430. Each server may have its own set of slots, for example slots 412 for server 402. The buckets on each server may correspond to the same numbered buckets on each of the other servers. For example, slots in B1 on server 402 may correspond to bucket B1 on server 404 and bucket B1 on server 406. Publication from a subscriber allocated to server 402, for example in slot 414, may be published to all buckets B1 on all servers, but not to any buckets B2 or B3.

In an embodiment, subscribers, such as subscriber 410, may be allocated to a particular server by any method that generally results in a substantially even distribution among the servers. In an embodiment, the servers may be ordered, and the subscriber's name or session ID may be hashed to determine to which ordered server the subscriber should be allocated.

In an embodiment, each server 402, 404, 406 may establish and maintain its own set of slots and buckets. Because each publication is broadcast to the same bucket on all servers, the publication rate over time for each server system will converge, and each server system will have the same number of buckets.

In another embodiment, one of the servers is selected as the primary server. That primary server determines how many buckets should be maintained, and each server in system 400 then mirrors that number. The primary server may also determine how the slots are mapped to the buckets.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 5:
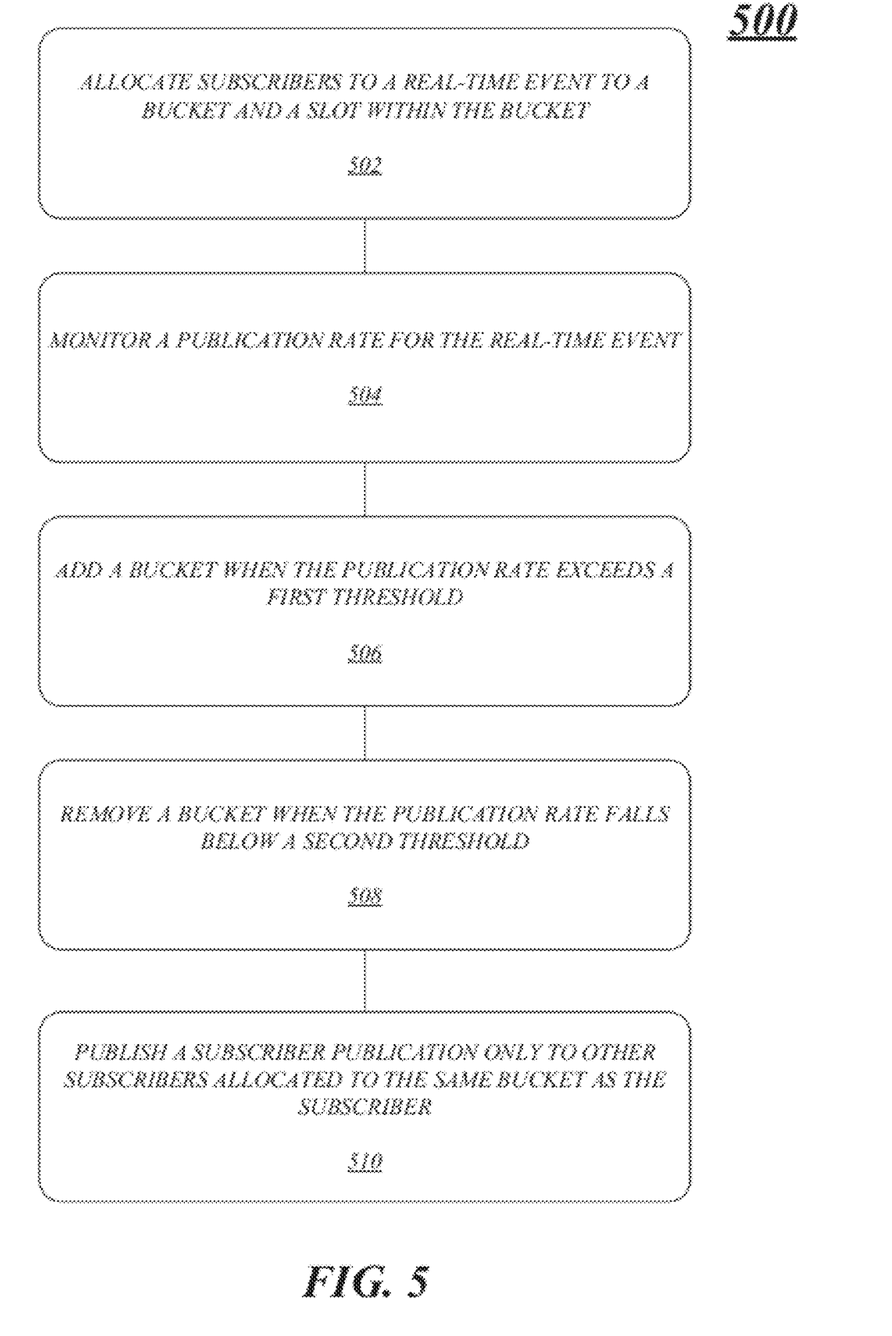
FIG. 5 illustrates an embodiment of a logic flow.

FIG. 5 illustrates an embodiment of a logic flow 500. The logic flow 500 may be representative of some or all of the operations executed by one or more embodiments described herein.

In the illustrated embodiment shown in FIG. 5, the logic flow 500 may allocate subscribers to a real-time event to a bucket and a slot within the bucket at block 502. For example, real-time event host 120 may hash a subscriber's name, session ID or other identifier to determine a slot to which the subscriber should be allocated. Other methods to achieve a substantially even initial distribution may also be employed. Slots may be assigned to a bucket as described, for example, in FIG. 2 or 3.

The logic flow 500 may monitor a publication rate for the real-time event at block 504. For example, real-time event host 120 may monitor an average publication rate per bucket over time for all of the buckets. Real-time event host 120 may monitor, in addition, or alternatively, a publication rate per bucket or per slot over time.

The logic flow 500 may add a bucket when the publication rate exceeds a first threshold (upper bound) at block 506. For example, real-time event host 120 may add a bucket as described in FIG. 2, FIG. 3, or may split a bucket as described above. In an embodiment, buckets may be added until the publication rate falls between the first and second thresholds.

The logic flow 500 may remove a bucket when the publication rate falls below a second threshold (lower bound) at block 508. For example, real-time event host 120 may remove a bucket and reallocate the slots of the bucket to another bucket, or may merge a bucket into another bucket such that the publication rate rises above the second threshold.

The logic flow 500 may publish a subscriber publication only to other subscribers allocated to the same bucket as the publishing subscriber in block 510. As discussed earlier, a publication from a subscriber in a bucket, say bucket A, is only published to other subscribers in bucket A. This reduces the number of publications that a subscriber needs to view, and helps to preserve context by not diluting a publication in an overwhelming volume of publication. When buckets are distributed over multiple servers, each bucket acts as a logical bucket, and a publication may be broadcast to multiple servers but only published to subscribers in the same logical bucket.

Figure 6:
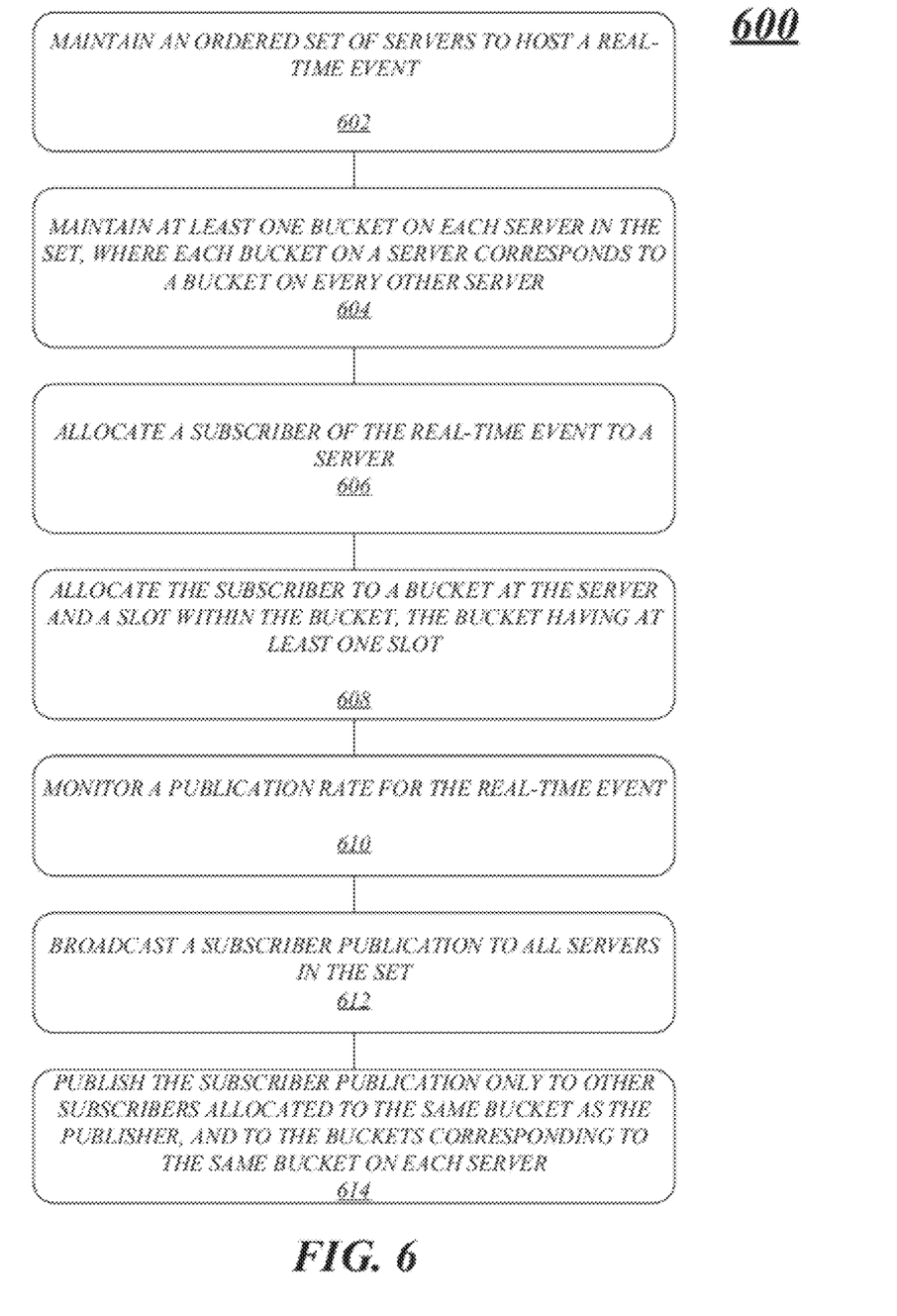
FIG. 6 illustrates an embodiment of a logic flow.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may maintain an ordered set of servers to host a real-time event at block 602. For example, real-time event host 120 may be implemented as the set of servers. Servers may be added or removed as needed according to network and event conditions.

The logic flow 600 may maintain at least one bucket on each server at block 604. Every bucket on a server may have a corresponding bucket on every other server, thereby creating a logical bucket. Each bucket may have at least one slot within it.

The logic flow 600 may allocate a subscriber to a server at block 606. For example, a subscriber's name or session ID may be hashed to determine to which server the subscriber is to be allocated.

The logic flow 600 may allocate the subscriber to a bucket and a slot at the server at block 608. Block 608 may be similar to block 502 of FIG. 5.

The logic flow 600 may monitor a publication rate for the real-time event at block 610. For example, each server in the set may monitor an average publication rate per bucket over time for all of the buckets at the server. Each server may monitor, in addition, or alternatively, a publication rate per bucket or per slot over time. In an embodiment, a primary server may monitor the publication rate over all the servers.

The logic flow 600 may broadcast a subscriber publication to all servers at block 612. For example, when a subscriber allocated to a particular server publishes a comment, the comment is sent to all servers in the set.

The logic flow 600 may publish the subscriber publication only to other subscribers allocates to the same logical bucket at block 614. That is, the publication may be broadcast to all servers in the set, but only published to the bucket on each server that corresponds to the bucket from which the publication came.

Figure 7:
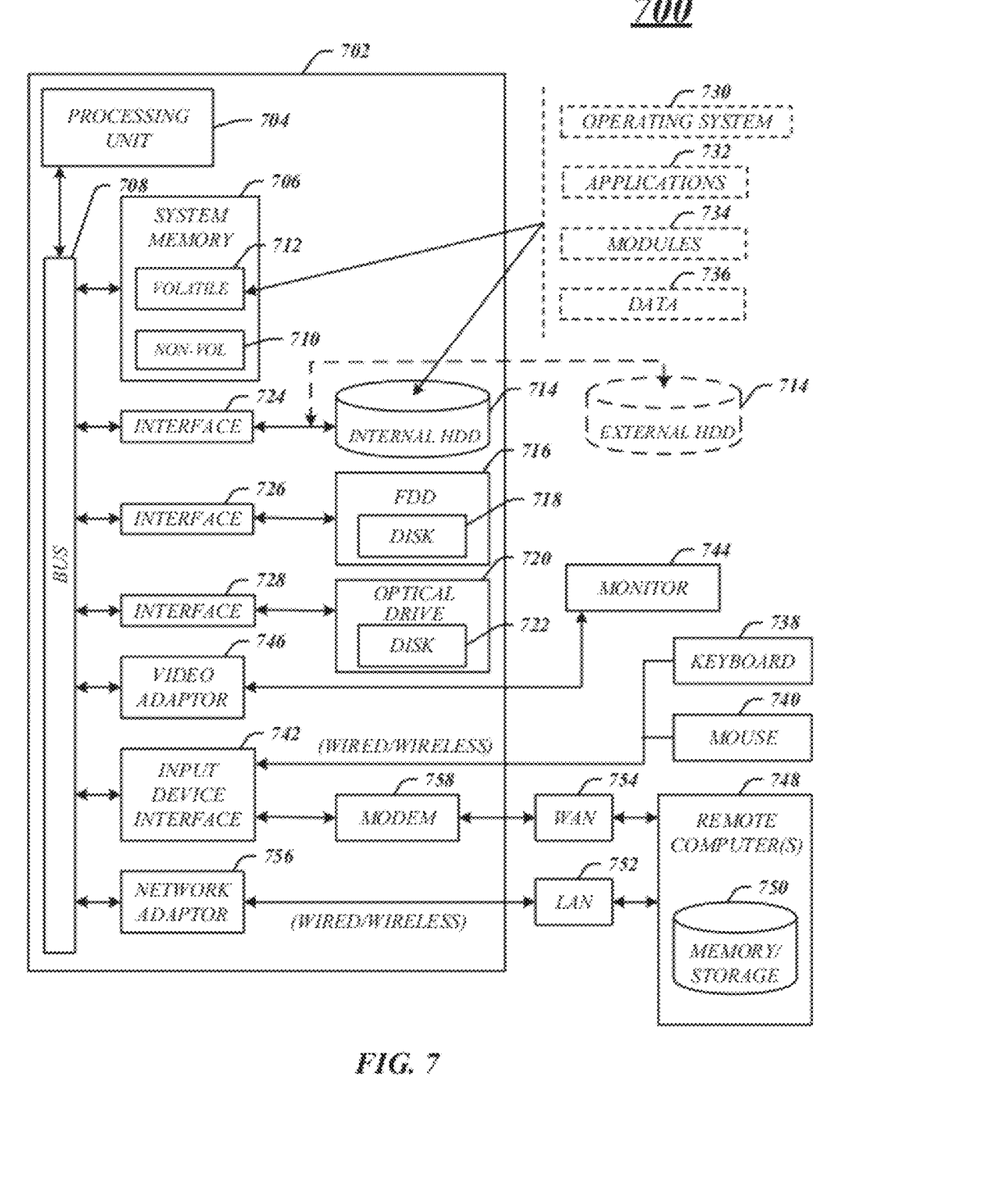
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
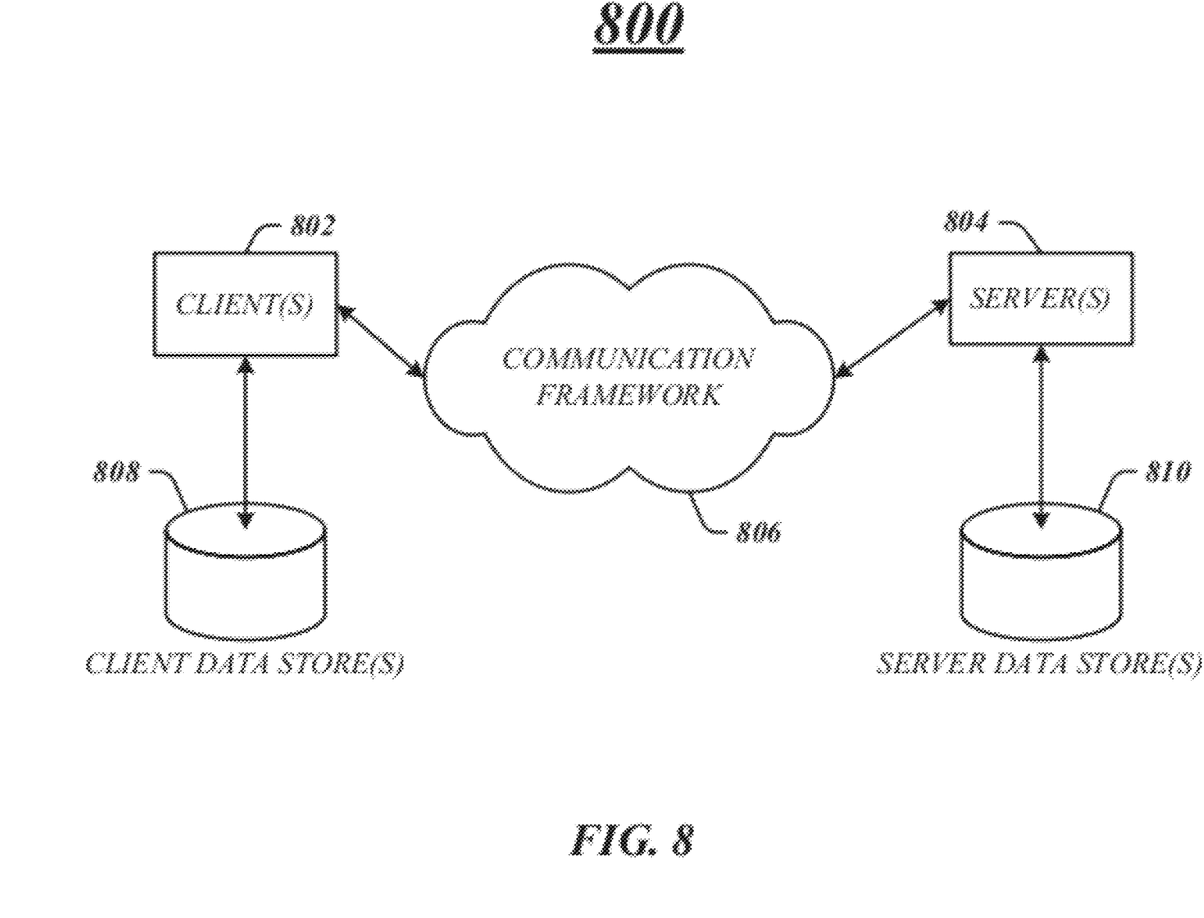
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the subscriber clients 110, 130. The servers 804 may implement the real time event host 120, and/or servers 402, 404, 406. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806, which may implement network 408 as described above.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
    allocating subscribers to a real-time event to a bucket and a slot within the bucket, the bucket having at least one slot;
    monitoring a publication rate for the real-time event;
    adding a bucket when the publication rate exceeds a first threshold;
    removing a bucket when the publication rate falls below a second threshold; and
    publishing a first subscriber publication only to other subscribers allocated to the same bucket as the first subscriber.

2. The method of claim 1, further comprising:
    allocating subscribers to a slot in a bucket by hashing a subscriber identifier to a slot number.

3. The method of claim 1, further comprising:
    ordering the total number of slots for the real-time event;
    allocating slots to a bucket by evenly dividing the slots among the buckets for the real-time event; and
    re-allocating the slots among the buckets while maintaining the order of the slots when a bucket is added.

4. The method of claim 1, wherein monitoring the publication rate comprises:
    monitoring a moving average rate of publications per bucket over a number of defined periods.

5. The method of claim 1, further comprising:
    monitoring a publication rate for each slot;
    adding ordered slots to the bucket while the publication rate is between the second threshold and the first threshold;
    adding a bucket and allocating a slot to the added bucket when adding the slot causes the publication rate to exceed the first threshold;
    removing the added bucket and allocating any slots in the removed bucket to a previous bucket when adding a bucket causes the publication rate to fall below the second threshold.

6. The method of claim 5, further comprising:
    allocating new slots to existing buckets in a round-robin fashion when no more buckets can be added.

7. The method of claim 1, further comprising:
    monitoring the publication rate for each bucket;
    dividing one bucket having a publication rate that exceeds the first threshold into two buckets until the publication rate per bucket falls to between the second and first thresholds; and
    merging one bucket having a publication rate that falls below the second threshold into another bucket until the publication rate per bucket rises to between the second and first thresholds.

8. The method of claim 7, wherein merging a bucket comprises:
    selecting a second bucket to merge with by selecting the second bucket such that the merged bucket publication rate does not exceed the first threshold.

9. An article of manufacture comprising a computer-readable storage medium comprising no signals containing instructions that if executed enable a system to:
    maintain an ordered set of servers to host a real-time event;
    maintain at least one bucket on each server in the set, wherein each bucket on a server corresponds to a bucket on every other server;
allocate a subscriber of the real-time event to a server;
    allocate the subscriber to a bucket at the server and a slot within the bucket, the bucket having at least one slot;
    monitor a publication rate for the real-time event; broadcast a first subscriber publication to all servers in the set; and publish the first subscriber publication only to other subscribers allocated to the same bucket as the first subscriber and to the buckets corresponding to the same bucket on each server.

10. The article of claim 9, further comprising instructions that if executed enable the system to re-allocate the subscriber to the same or a different server when a server is added to or removed from the ordered set of servers.

11. The article of claim 9, further comprising instructions that if executed enable the system to select one server in the set of servers as a primary server, wherein the primary server determines the number of buckets and the allocation of slots to buckets to be used by all of the servers.

12. The article of claim 9, further comprising instructions that if executed enable the system to:
    add a bucket at the server when the publication rate at a server exceeds a first threshold; and
    remove a bucket from the server when the publication rate at the server falls below a second threshold.

13. The article of claim 12, further comprising instructions that if executed enable the system to:
    order the total number of slots for the real-time event;
    allocate slots to a bucket by evenly dividing the slots among the buckets for the real-time event; and
    re-allocate the slots among the buckets while maintaining the order of the slots when a bucket is added.

14. The article of claim 12, further comprising instructions that if executed enable the system to:
    monitor a publication rate for each slot;
    add ordered slots to the bucket while the publication rate is between the second threshold and the first threshold;
    add a bucket and allocate a slot to the added bucket when adding the slot causes the publication rate to exceed the first threshold; and
    remove the added bucket and allocate any slots in the removed bucket to a previous bucket when adding a bucket causes the publication rate to fall below the second threshold.

15. The article of claim 12, further comprising instructions that if executed enable the system to:
- monitor the publication rate for each bucket;
- divide one bucket having a publication rate that exceeds the first threshold into two buckets until the publication rate per bucket falls to between the second and first thresholds; and
- merge one bucket having a publication rate that falls below the second threshold into another bucket until the publication rate per bucket rises to between the second and first thresholds.

16. An apparatus, comprising:
- a processor; and
- a real-time event host module operative on the processor to:
- allocate subscribers to a real-time event to a bucket and a slot within the bucket, the bucket having at least one slot;
- monitor a publication rate for the real-time event;
- add a bucket when the publication rate exceeds a first threshold;
- remove a bucket when the publication rate falls below a second threshold; and
- publish a first subscriber publication only to other subscribers allocated to the same bucket as the first subscriber.

17. The apparatus of claim 16, the real-time event host module further operative to:
- order the total number of slots for the real-time event;
- allocate slots to a bucket by evenly dividing the slots among the buckets for the real-time event; and
- re-allocate the slots among the buckets while maintaining the order of the slots when a bucket is added.

18. The apparatus of claim 16, the real-time event host module further operative to:
- monitor a publication rate for each slot;
- add ordered slots to the bucket while the publication rate is between the second threshold and the first threshold;
- add a bucket and allocate a slot to the added bucket when adding the slot causes the publication rate to exceed the first threshold;
- remove the added bucket and allocate any slots in the removed bucket to a previous bucket when adding a bucket causes the publication rate to fall below the second threshold.

19. The apparatus of claim 16, the real-time event host module further operative to:
- monitor the publication rate for each bucket;
- divide one bucket having a publication rate that exceeds the first threshold into two buckets until the publication rate per bucket falls to between the second and first thresholds; and
- merge one bucket having a publication rate that falls below the second threshold into another bucket until the publication rate per bucket rises to between the second and first thresholds.

20. The apparatus of claim 16, wherein:
- the apparatus is one of a set of servers;
- each bucket on the apparatus corresponds to a bucket of each of the other servers in the set; and
- the first subscriber publication is published only to other subscribers allocated to the same bucket as the first subscriber and to the buckets corresponding to the same bucket on each server in the set.

* * * * *